(12) United States Patent
McCarson

(10) Patent No.: US 12,086,178 B2
(45) Date of Patent: Sep. 10, 2024

(54) GENERATIVE AI SYSTEMS AND METHODS FOR SECURITIES TRADING

(71) Applicant: Brian McCarson, Chandler, AZ (US)

(72) Inventor: Brian McCarson, Chandler, AZ (US)

(*) Notice: Subject to any disclaimer, the term of this patent is extended or adjusted under 35 U.S.C. 154(b) by 0 days.

(21) Appl. No.: 18/625,612

(22) Filed: Apr. 3, 2024

(65) Prior Publication Data

US 2024/0265047 A1    Aug. 8, 2024

Related U.S. Application Data

(63) Continuation-in-part of application No. 18/342,461, filed on Jun. 27, 2023, which is a continuation-in-part
(Continued)

(51) Int. Cl.

| | |
|---|---|
| *G06F 16/587* | (2019.01) |
| *G06F 16/907* | (2019.01) |
| *G06F 18/20* | (2023.01) |
| *G06F 18/2133* | (2023.01) |
| *G06F 18/2415* | (2023.01) |
| *G06N 3/08* | (2023.01) |
| *G06N 7/01* | (2023.01) |
| *G06V 10/764* | (2022.01) |
| *G06V 10/84* | (2022.01) |
| *G06V 20/10* | (2022.01) |
| *G06V 20/13* | (2022.01) |

(Continued)

(52) U.S. Cl.
CPC .......... *G06F 16/587* (2019.01); *G06F 16/907* (2019.01); *G06F 18/2133* (2023.01); *G06F 18/24155* (2023.01); *G06F 18/29* (2023.01); *G06N 3/08* (2013.01); *G06N 7/01* (2023.01); *G06V 10/764* (2022.01); *G06V 10/84* (2022.01); *G06V 20/13* (2022.01); *G06V 20/188* (2022.01); *G08G 1/0133* (2013.01); *G08G 3/00* (2013.01); *G08G 5/0004* (2013.01)

(58) Field of Classification Search
CPC .. G06F 16/587; G06F 16/907; G06F 18/2133; G06F 18/217; G06F 18/24155; G06F 18/29; G06N 3/04; G06N 3/044; G06N 3/045; G06N 3/0464; G06N 3/0675; G06N 3/08; G06N 3/092; G06N 3/0985; G06N 7/01; G06N 20/00; G06N 20/10; G06N 20/20; G06V 10/70; G06V 10/764; G06V 10/84; G06V 20/13; G06V 20/188; G06V 20/52; G06V 2201/10; G08G 1/0133; G08G 3/00; G08G 5/0004
See application file for complete search history.

(56) References Cited

U.S. PATENT DOCUMENTS

| | | | |
|---|---|---|---|
| 2017/0041874 A1* | 2/2017 | Jarosinski | ......... H04M 1/72454 |
| 2018/0198831 A1* | 7/2018 | Calcaterra | ............... H04L 43/20 |

(Continued)

*Primary Examiner* — Shane D Woolwine
(74) *Attorney, Agent, or Firm* — Newman Jones PLLC

(57) ABSTRACT

Generative AI systems and methods are provided to provide recommendations as to whether a particular security associated with a corporate entity and/or its competitors should be purchased, sold, or held, as determined from a range of available data sources. A consistent, semantic metadata structure is described as well as a hypothesis generating and testing system capable of generating predictive analytics models in a non-supervised or partially supervised mode. Users may then subscribe to the date for the use in economic forecasting.

17 Claims, 7 Drawing Sheets

Related U.S. Application Data of application No. 17/840,390, filed on Jun. 14, 2022, which is a continuation of application No. 16/797,640, filed on Feb. 21, 2020, now Pat. No. 11,361,202.

(51) Int. Cl.
*G08G 1/01* (2006.01)
*G08G 3/00* (2006.01)
*G08G 5/00* (2006.01)

(56) References Cited

U.S. PATENT DOCUMENTS

2019/0147305 A1* 5/2019 Lu .................. G06F 18/2413
                                                          382/157
2019/0332863 A1* 10/2019 Abhishek ............. G06F 3/011

* cited by examiner

GENERATIVE AI SYSTEMS AND METHODS FOR SECURITIES TRADING

CROSS-REFERENCE TO RELATED APPLICATIONS

The present application is a continuation-in-part of U.S. patent application Ser. No. 18/342,461, entitled "Generative AI Systems and Methods for Economic Analytics and Forecasting," filed Jun. 27, 2023, the entire contents of which are hereby incorporated by reference.

TECHNICAL FIELD

The present subject matter relates, generally, to the use of artificial intelligence in the field of economics. More particularly, the present subject matter relates to the use of machine learning (ML) and other artificial intelligence (AI) techniques for economic analytics, forecasting, and autonomous decision making applied to securities trading.

BACKGROUND

Historically, the prediction of future economic activity and the behavior of stocks, bonds, commodities, and other tradable assets has been based on human-driven, empirical studies of lagging indicators-such as historical trends in retail sales, industrial production, average prime interest rates, unemployment levels, wage growth, interest rates, inflation rates, monthly housing starts, crop planting and yield reports, lumber harvesting, agriculture or aquaculture activity, mining activity, construction activity and similar economic metrics. These indices are important tools to a wide range of individuals and financial institutions, particularly securities traders, fund managers, government regulators, land management specialists, water management rights managers, farmers, agricultural equipment manufacturers, ranchers, businesses, chemical suppliers, environmental scientists and the like.

Currently known methods for predicting economic activity and associated metrics are unsatisfactory in a number of respects, in part because they rely on human-formulated hypothesis, intuition, heuristics, publicly available documents (e.g., aggregated quarterly reports for a sector), and/or "technical analysis" of numerical trend data. Trades, positions, and other investment decisions are often based on real time inferences drawn from these indices. High asset value fund managers know that beating a forecast by even a fraction of a percentage point—or receiving pertinent information just seconds earlier than a manager of a competing fund—can instantly result in billions of dollars gained (or lost). Thus, fund managers relentlessly seek real-time "hints" to incrementally sharpen their vision of future economic performance. Environmental regulators, water rights managers, forest managers all would benefit from receiving qualitative information regarding reservoir water level changes, lumber harvesting patterns, spread of diseased trees in a forest, changes in roadway usage, construction patterns, volume of earth moved for mining activities, among other types of information.

More generally, the complexity of unstable market forces, combined with the not-always-rational behavior of its participants, suggests that no single factor can reliably predict future market performance, even within a discrete market sector. Rather, multiple factors often coalesce within a fire hose of disparate data streams and datasets, rendering them beyond the grasp of even the most astute financial scholars. Indeed, one estimate suggests that, by the year 2025, global data production will exceed 460 exabytes ($10^{18}$ bytes) per day. It is simply not possible for human beings to perform traditional hypothesis testing on data of these magnitudes.

Thus, there is a long-felt need for improved methods of identifying, collecting, synthesizing, and processing groups of data to correctly predict the value and/or state of variables that characterize future economic activity or behavior, as well as for improved ways of discovering, vetting, testing, and quantifying the correlations among the factors upon which predictive models are built. More particularly, there is a need for improved methods for utilizing ML and other AI-related techniques for economic analytics, forecasting, and autonomous decision making applied to securities trading.

BRIEF SUMMARY

Embodiments of the present invention relate to AI-based systems and methods for modeling the behavior of securities such as stocks, bonds, commodities, and other tradable assets using tools such as machine learning (ML), generative AI, intelligent agents (also referred to as "trigger agents"), advanced natural language processing (NLP) and large language models (LLM), predictive analytics (or "economic analytics"), visual analytics, time-series models, and other such techniques.

More generally, the systems and methods described herein represent a significant advance toward an artificial general intelligence (AGI) that can operate in the economic space, generating and testing economic hypotheses on its own, and determining whether the resulting conclusions are statistically significant and/or fall within some predetermined validity metric. Stated another way, by using advanced ML and AI tools such as intelligent agents, transformer networks, reinforcement learning from human feedback (RLHF), and the like—and applying these tools in a novel way to a heterogeneous set of empirical observations and past experimental results—the scientific method itself can be implemented at scales and at a speed impossible to achieve by human researchers alone.

BRIEF DESCRIPTION OF THE DRAWING FIGURES

The present invention will hereinafter be described in conjunction with the appended drawing figures, wherein like numerals denote like elements, and:

Figure 3:
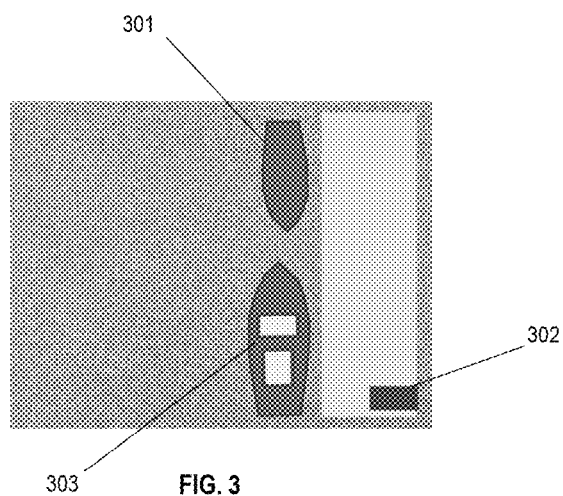
Figure 4A:
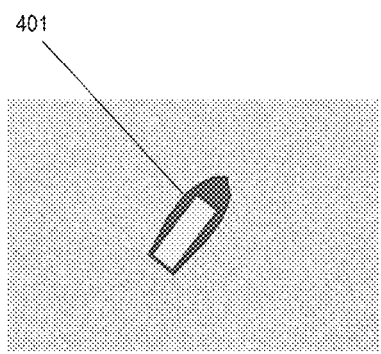
Figure 4B:
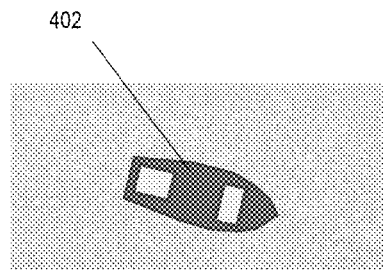

FIGS. 3, 4A, and 4B illustrate example marine port environments seen in aerial view.

Figure 6:
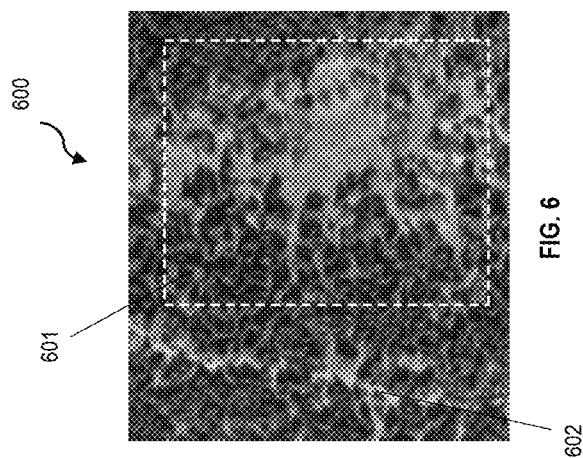
Figure 5:
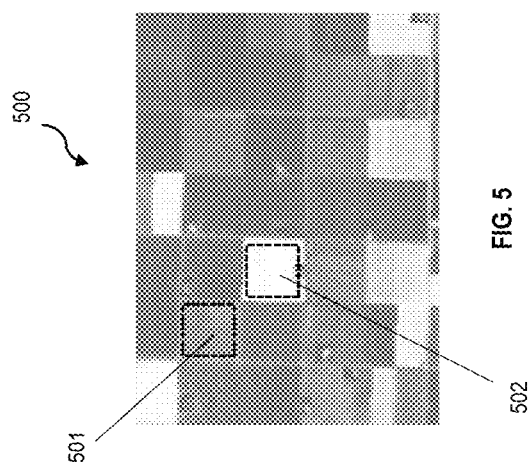
Figure 7:
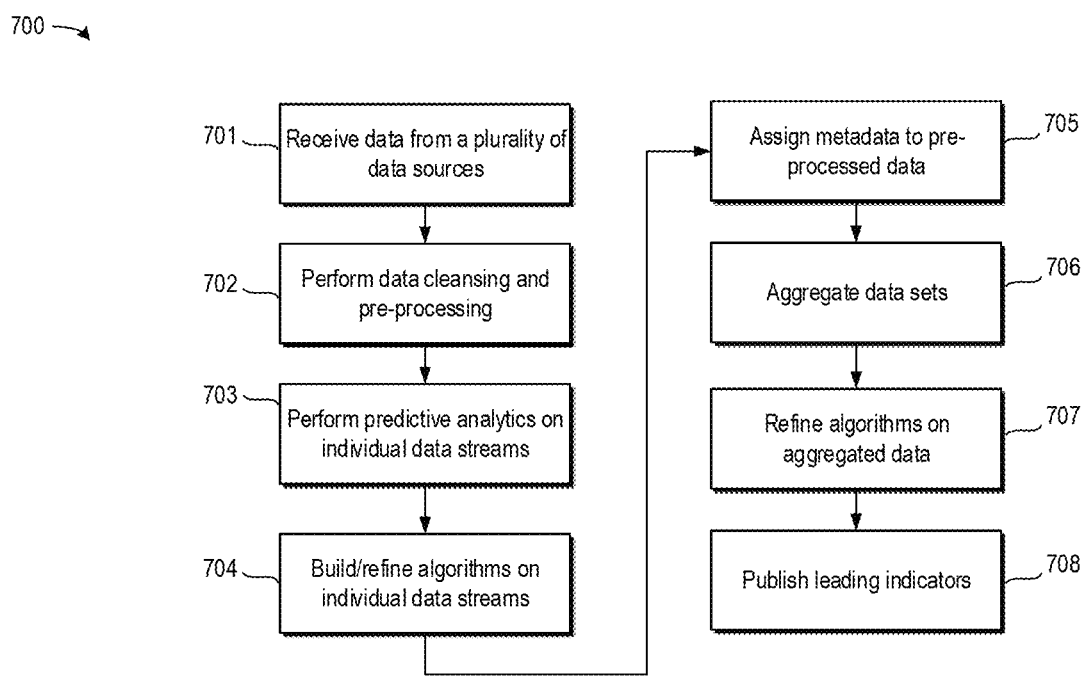
Figure 8:
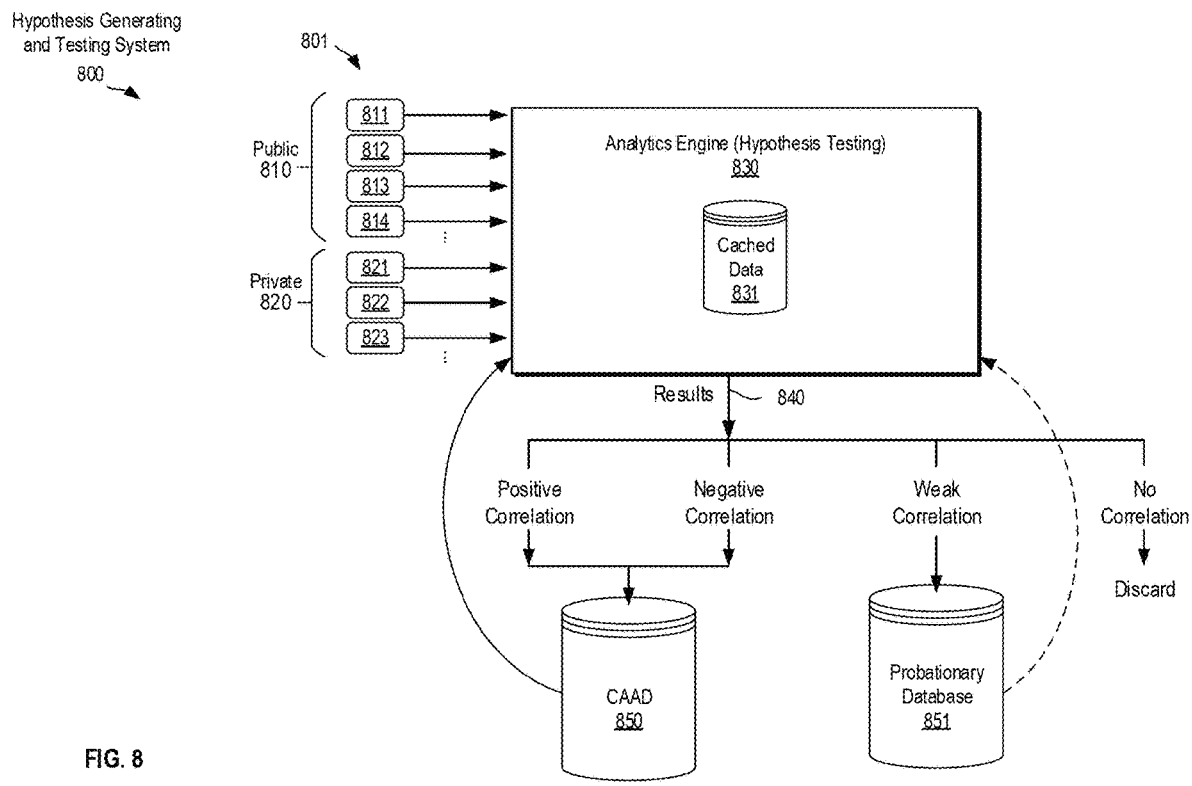
Figure 9:
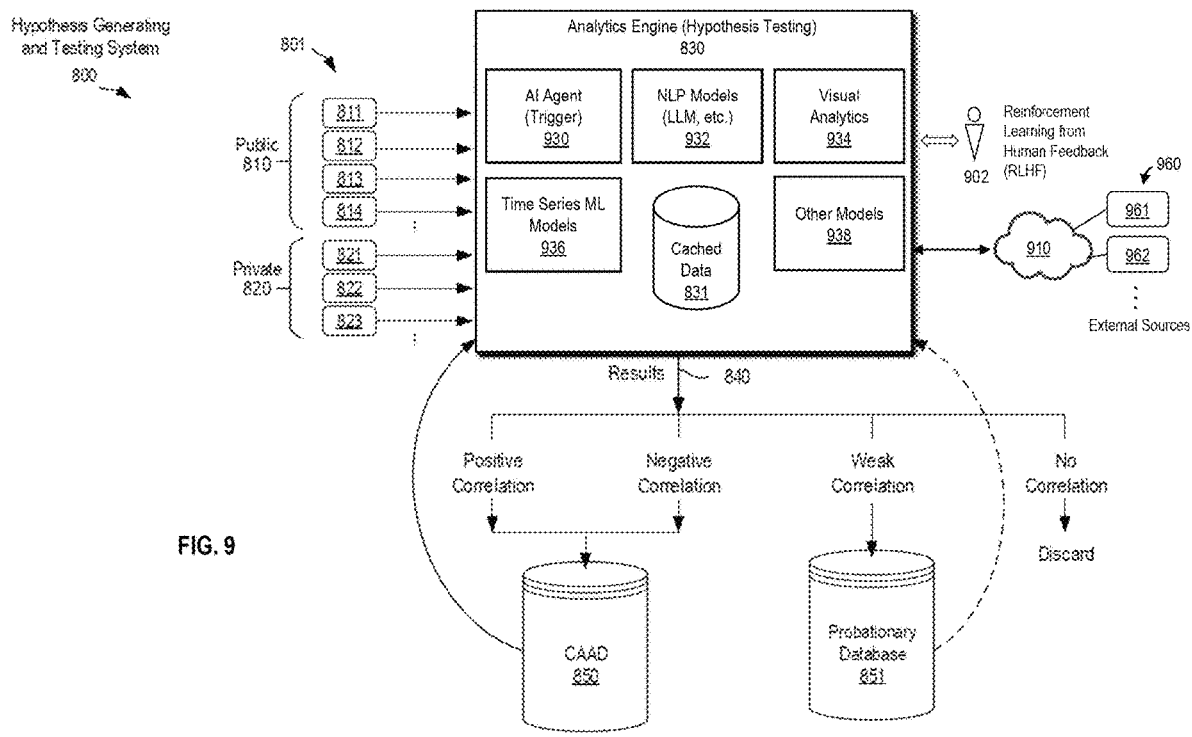

FIG. 5 illustrates an example farm environment seen in aerial view;

FIG. 6 illustrates an example lumber harvesting environment seen in aerial view;

FIG. 7 is a flowchart illustrating a method in accordance with various embodiments;

FIG. 8 is a conceptual block diagram of a hypothesis generation and testing system (HGTS) in accordance with various embodiments;

FIG. 9 is a conceptual block diagram of an alternate embodiment of the HGTS illustrated in FIG. 8.

DETAILED DESCRIPTION

The present disclosure relates to improved AI and ML-related techniques for analysis, forecasting, and autonomous decision making as applied to securities trading. This is accomplished by generating and testing—e.g., via autonomous agents-economic hypotheses that are then assessed based on statistical significance, correlation coefficients, and/or other predetermined validity or performance metrics (generally referred to as a "performance criterion"). Previous empirical studies and results may be used, as well as models and predications that are stored in a "probationary database," as described in further detail below. A wide range of public and private data sources may be accessed and processed to arrive at these results, examples of which are presented below. It will be appreciated, however, that the invention is not limited to the presented examples, and that systems and methods in accordance with the present invention may be used in conjunction with any available data sources relevant to the economic forecasting task at hand.

In addition, the present subject matter describes methods by which users may subscribe to proprietary services to gain access to the indicators. In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to economic indicators, securities trading, market activity, retail and services business outcomes, financial transactions, machine learning models, and data analytics techniques may not be described in detail herein.

Figure 1:
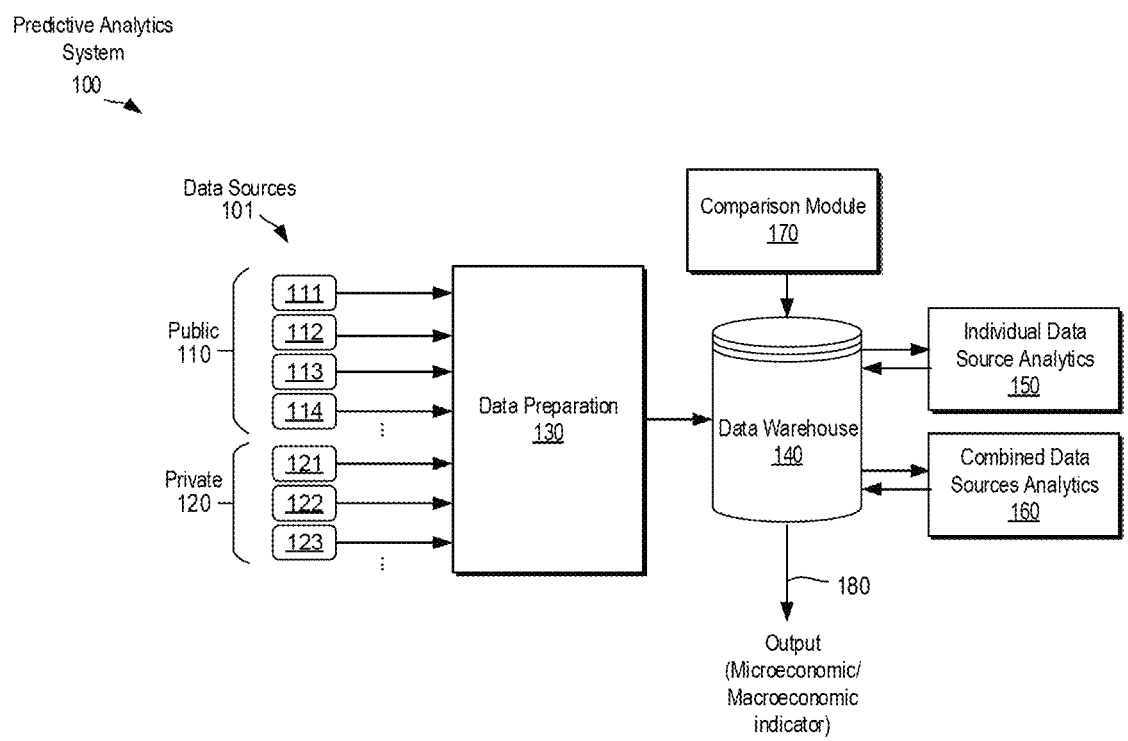
FIG. 1 is a conceptual block diagram illustrating predictive analytics system in accordance with various embodiments.

Referring first to the conceptual block diagram of FIG. 1, various embodiments may be implemented in the context of a predictive analytics system ("PAS") 100. As illustrated, PAS 100 includes a data preparation module 130 configured to receive data from a wide range of data sources 101 (e.g., 111-123), some of which might be public (110) as described in more detail below, and others that that might be private (120). Data preparation module 130 is generally configured to clean and otherwise process the data received from data sources 101 and subsequently store the processed data and metadata where needed in a data warehouse 140. Two analytics modules (150, 160) and a comparison module 170 interact with data warehouse 140 in order to produce, using the factors and predictor variables derived from data sources 101, an output 180 which, as described in further detail below, corresponds to a target variable corresponding to an ecological, environmental, agricultural, aquacultural, construction, mining, transportation, retail transaction, financial transaction, product or services consumption, microeconomic and/or macroeconomic leading indicator.

As a preliminary matter, it will be understood that the data received from data sources 101 may take a variety of forms and may exhibit or embody one or more of a wide range of attributes. Thus, for example, the data will often take the form of discrete or continuous numerical data (e.g., integers, floating point numbers, etc.) or categorical data (e.g., unordered or ordered categories). The data may be provided, for example, as a series of time-varying scalar values, as matrices or tables, as an arbitrary tensor of a given dimensionality, image or series of images, videos, audio files or any other form now known or later developed. Data sources 101 and the datasets derived therefrom are thus the predictor variables used for producing the associated machine learning model(s). In that regard, the phrase "machine learning model" may be used to refer to a set of individual machine learning models, each having a different type and purpose. For example, a convolutional neural network (CNN) model may be used to perform object detection and classification in a scene, while a separate CNN may be used to determine the speed and/or acceleration of an object in a scene.

In addition to pre-processed summary and descriptive statistics, data sources 101 may represent the output of one or more sensors configured to determine a binary or non-binary value or state of the environment and provide a raw or processed stream of information relating to that environment (or objects within the environment). Non-limiting examples of such sensors include optical cameras (for providing discrete or sequential data frames representing images or video feeds), infrared cameras, LIDAR sensors (producing point-clouds of objects in the environment), SONAR and RADAR sensors, microphones, acoustic mapping sensors, natural language processing systems, vibration or weather-related sensors (temperature, humidity, seismic activity, etc.), proximity sensors, gas detectors, pressure sensors, soil monitoring sensors, water level sensors, crop monitoring sensors, global positioning system sensors, wireless radio sensors, geo-location sensors, and the like.

Data sources 101 may be categorized as either public (110) or private (120). As used herein, public or "open" data sources are those sources of data that are generally available free of charge (or for a nominal fee) to individuals and/or corporate entities, typically in electronic form via the Internet. Such public data sources may be provided, in many instances, by governmental entities, but might also be provided by (or otherwise available from) private companies. In contrast, "private" data sources are those that are fee based, behind a paywall, or otherwise require a form of permission for access. With respect to both public and private data sources, the data itself may be anonymized, pseudonymized, or provided in accordance with a differential privacy (DP) protocol.

Non-limiting examples of public data sources include: (1) social media feeds (e.g., Facebook, Twitter, YouTube, Instagram, Tumblr, Pinterest, Facebook Graph API, LinkedIn, Social Mention, WeChat, Baidu, Google Trends, etc.); (2) mapping and satellite data (Google Maps, Google Earth, MapQuest, Bing Maps, Apple Maps, Federal, Regional or Local Government Agencies, etc.); (3) municipal street, highway, pedestrian walkway or port of entry traffic, waterway, shipping dock or seaport vessel traffic, airport commercial or passenger aircraft traffic, railway commercial or passenger traffic, pedestrian traffic or automobile traffic camera feeds; (4) open datasets relating to global issues, such as the World Health Organization (WHO) Open data repository, Google Public Data Explorer, the European Union Open Data Portal, the U.S. Census Bureau; (5) financially focused open data sources such as the UN Comtrade Database, the International Monetary Fund (IMF) datasets, the U.S. Bureau of Economic Analysis, the U.S. Securities and Exchange Commission, the National Bureau of Economic Research World Bank Open Data; (6) crime data, such as the FBI Uniform Crime Reporting Program, the National Archive of Criminal Justice Data (NACJD); (7) academic datasets, such as Google Scholar, Pew Research Center, National Center for Education Statistics; (8) environmental data, such as Climate Data Online (CDO), National Center for Environmental Health (NCEH), the IEA Atlas of Energy; (9) business directory data, such as Glassdoor, Yelp, LinkedIn, Open Corporates, and the like.

Private data sources may include, for example, Bloomberg, Capital IQ, and Thompson Reuters financial databases, as well as other subscription-based access to audio, video, or image feeds that may be provided by various entities. Additional data feeds might include onboard vehicle camera data sources provided by commercial or passenger vehicle manufacturers or third party or public transportation operators, security camera feeds provided by commercial or residential real estate property owners or their leased business owners. Location and movement tracking information may be derived from global positioning systems, mobile phone or radio tower tracking, retail order or financial banking, credit card, debit card, mobile phone, social media-based, cryptocurrency, purchase or currency exchange transaction information. Private data sources might also include purchase, shipping and receiving tracking information for parcels, goods, services; crop planting, harvesting and yield information; livestock breeding, fishing, herding or other animal production or slaughter information; raw material or refined goods production, storage, sale or trading information such as crude and refined oil or natural gas as well as minerals, lumber, cement or other physical materials; service call records; environmental resource utilization records; and equipment utilization or tracking information.

In accordance with edge-computing or cloud-computing principles, video and/or still image data may be processed or analyzed to extract relevant information prior to being provided to data preparation module 130. For example, object detection and classification may be performed on images based on an appropriately trained convolutional neural network (CNN) model, and the resulting classifications and or regression parameters may be stored as metadata, as described in further detail below. In other embodiments, data sources 101 provide raw, unprocessed data that is handled by data preparation module 130.

While the present invention may be utilized in a wide range of data sources, in accordance with one embodiment, system 100 is used to make inferences—and produce an appropriate leading indicator output 180 (e.g., a temporally leading indicator)—based on observations relating to agricultural or aquacultural activity, such as the behavior, patterns, activities of farming equipment; the tilling, growth, volume, color, density, height, yield of planted crops, the response of planted crops to ecological or environmental events, trends in temperature, timing of seasonal changes relative to tilling, planting, fertilizing or harvesting activity and the like. Furthermore, this same methodology could be applied to monitoring of livestock and ranching activity in pastures or open ranges or monitoring the activity and output of fishing vessels, fish hatcheries, fish farming in any type of water body.

In that regard, FIGS. 3 and 4 depicts an example of marine port environment as seen in aerial view. More particularly, as shown in FIG. 3, two fishing vessel's 301 and 303 are shown located at a port, along with one or more sensors, such as a land-based video camera 302. In FIGS. 4A and 4B, vessels 401 and 402 are seen in open water harvesting fish in different environments.

In one embodiment, for example, various sensors (e.g., 302) are cameras (e.g., a combination of IR and optical cameras) whose positions and orientations give them a view of the approaching vessels. Thus, sensor 302 corresponds to one or more data sources 101 as illustrated in FIG. 1, and may be considered a public data source (e.g., a stationary Internet webcam) or a private data source (e.g., camera access provided for a fee). Sensor 302, when used in conjunction with the predictive analytics system 100, is capable of observing a number of attributes of vessels 301 and 303.

In addition, referring now to FIGS. 5 and 6, sensors may be used to produce images that can be analyzed to determine the number and position of farming vehicles, crop harvesting machines, crop transportation vehicles, lumber harvesting machines, lumber transporting vehicles, number and type of livestock and the like. Satellite or aerial images can be analyzed either statically or as a series over time to provide an assessment of the production activity on the land and combined with other imaging or sensing sources to provide assessments of the types and health of the agricultural, ranching, grazing, aquaculture, harvesting, mining, forested areas, etc.

In FIG. 5, for example, two farm regions (501 and 502) are identified within an agricultural environment 500. Various attributes of each region may be determined using appropriate sensors and other available information, such as farm ID, dimensions, location (long./lat.), area, activity log information (e.g., "soybeans planted Feb. 13, 2023"), current status, such as soil moisture, phosphorus level, nitrogen level, luminescence rate, sunlight dose, and other metadata such as insect infestation probability, disease log information, crop rotation history, and the like.

Similarly, in FIG. 6, a lumber harvesting region 601 is identified adjacent to a logging road 602 within an environment 600. As with the farm regions shown in FIG. 5, various attributes of each region may be determined using appropriate sensors and other available information, such as region ID, dimensions, location, area, activity log information (e.g., "45% deforested"), logging permit number, current status, such as soil moisture, forest cover, luminescence rate, sunlight dose, and metadata such as insect infestation probability, disease log information, logging vehicle identifiers, and the like.

While not illustrated in the drawings, a further machine learning or deep learning model (e.g., a convolutional neural network) may be used to identify the unique characteristic of a plot or region of land relative to the types and methods of equipment utilized for agricultural purposes, the rotation and timing of crops, timing of irrigation or fertilization, proximity in time to planting, harvesting, watering or fertilizing events relative to ecological or environmental factors can all be tracked over time. Spectral analysis from aerial, satellite, ground images can be used to identify the color of foliage, the size of grazing cattle, the nutrient density in turned soil, the level of moisture in the soil, the density of fruit in an orchard, among many other examples. This activity trending can be used to create custom predictive analytics which can be offered to owners or caretakers of that land, regional governments, farming collectives or coalitions, agricultural manufacturers, fertilizer or seed producers, as a paid subscription or one-time analysis service that is very specific to their precise geography and environmental or regional conditions. Furthermore, one could also track where different plot or regions of land or where specific crops are sent for processing and use this to assess supply/demand trends in advance of potential pricing moves on the market given where agricultural products are being sent, shipped, stored, processed and/or sold. With the aggregation of data as described above, systems in accordance with this invention can predict where regions will see either reduced or increased production in metrics such as crop yields, cattle growth, improved recommendations for crop rotations, planting or harvesting timing or other similar or related events or information that would be influenced by environmental or ecological changes and events.

In the case of monitoring fishing vessels, side view images provided by sensors on shore or aerial or satellite images can be used with other available public and private data sources to characterize the activity, behavior and economic output of fishing vessels. For example, the wake region extending from the stern of the vessel may be analyzed from its top view image (as might be available from satellite data). That is, both the dispersion angle θ and wake distance x may be correlated to the amount of water being displaced over time, which will directly correlate to weight and speed of the vessel, which itself relates to the amount of goods being transported pre and post a fishing harvest. Furthermore, given that fishing vessels will have unique identifying features, the travel patterns of specific vessels can be tracked over time and activity from any domestic or international port can be tracked over time to identify precisely which ones are complying with regional or international fishing laws, which vessels are or are not complying with appropriate fishing techniques to prevent ecosystem damage from improper fishing or over fishing. Such information can be shared with businesses, individuals, regional or international government bodies, commodities traders, supply chain managers, educational institutions, among others.

In accordance with another embodiment, system 100 may be used to make inferences based on environmental or ecological patterns associated with the natural or human-influenced distribution of water. For example, i) utilizing aerial, satellite or ground-based monitoring of the volume and density of precipitation and/or snowfall that feeds tributaries to creeks, marshes, rivers, lakes or other water sources that could feed municipal, agricultural, rural or urban communities, ii) monitoring the rise and fall of water reservoirs across an entire region over time, iii) monitoring the use of well-based water pumping over time, iv) monitoring the use of pipelines, desalinization facilities, irrigation canals, rivers, or other methods of transporting water to a region, v) tracking public or private information about utilization of water rights, water use licenses, water production or utilization reports and vi) correlating that information to observed weather or ecological trends and events over time.

The resulting information can be compiled and used to create custom predictive analytics which can be offered to owners or caretakers of that land, regional governments, farming collectives or coalitions, water rights management organizations, businesses, individuals, water rights investors as a paid subscription or onetime analysis service that is very specific to their precise geography and environmental or regional conditions.

In accordance with another embodiment, system 100 may be used to make inferences relating to lumber harvesting (as shown in FIG. 6), mining, or other natural resource economic indicators. In such cases, data sources 101 might include, without limitation: (1) satellite images, aerial images, ground based images as they change over time, which can be used to determine changes in i) volume or density of any given forest, jungle, rainforest or other harvestable land area over time to determine the impact and/or health of an ecosystem, or in ii) the volume of earth moved, displaced, mined or transported for the purposes of harvesting natural materials over time to determine the volume of raw materials that are expected to be harvested. The quantity of lumber removed from an area of forest, the volume of trees impacted by forest fires, diseases, droughts, or other environmental factors, etc.; (2) private or publically available information from government agencies re lumber harvesting permits or mining activities by region; (3) public data on regional climate patterns, such as rainfall, freeze temperatures, droughts, flows, snow, fires, and the like; (4) sensing data from individual forest areas, land areas or groups of regions; (5) lumber, rare earth element, coal or any other harvested commodity market prices for local, regional, international markets; (6) road camera images that show transportation of harvested and processed goods over time; (7) satellite imagery illustrating lumber or refined material storage. In accordance with this embodiment, the output 180 may relate to commodity price predictions or any other related raw material indices.

In general, the systems and methods described above may be specifically applied to attributes of pedestrians observed in the environment. In such an embodiment, at least one of the plurality of datasets includes first sensor data derived from direct observation of activity within an environment, and the plurality of datasets includes a set of pedestrian attributes.

In accordance with one embodiment, the set of pedestrian attributes includes (1) pedestrian movement data, (2) pedestrian appearance data, and (3) connections or correlations to other datasets that contain associated information about identified pedestrians.

The pedestrian movement data includes any data associated with the dynamic and/or behavioral aspects on an individual or a group of individuals, such as their observed movement in the environment. As non-limiting examples, the pedestrian movement data may include speed, gait, direction, acceleration, vertical movement, activities being performed, and/or hand gestures.

The pedestrian appearance data includes any data associated with the visual appearance (other than movement data) of an individual or a group of individuals. As non-limiting examples, the pedestrian appearance data may include information relating the age, gender, height, weight, facial expression, physical health, clothing style or clothing brands, carried objects, luggage, grocery bags, backpacks, travel gear, posture, pets, and/or proximity to other pedestrians. The pedestrian appearance data may also include a plurality of brand names or styles associated with the carried objects. It will be understood that these examples are not intended to be limiting, and that the present invention comprehends any form of appearance information available in any convenient format (e.g., visible light, infrared, etc.).

In one embodiment, the plurality of datasets includes pedestrian experience, activity or outcome data comparing the set of pedestrian attributes prior to pedestrians entering a region-of-interest with the pedestrian attributes after leaving the region-of-interest. That is, pedestrian attributes which may also include identifying characteristics to track individual pedestrians over time.

Additional details regarding this pedestrian-centric embodiment may be found in U.S. patent application Ser. No. 18/157,981, filed Jan. 23, 2023, entitled "Systems and Methods for Deriving Leading Indicators of Economic Activity using Predictive Analytics Applied to Pedestrian Attributes to Predict Behaviors and Influence Business Outcomes," the entire contents of which are hereby incorporated by reference.

Referring again to FIG. 1, data preparation module 130 includes any suitable combination of hardware, software, and firmware configured to receive data from data sources 101 and process the data for further analysis by system 100. The processing required by each data source 101 will generally vary widely, depending upon the nature of the data and the use that will be made of the data. Such processing might typically include, for example, data cleaning (e.g., removing, correcting, or imputing data), data transformation (e.g., normalization, attribute selection, discretization), and data reduction (numerosity reduction, dimensionality reduction, etc.). These techniques are well known in the art, and need not be described in further detail herein.

In addition to standard data pre-processing techniques, data preparation module 130 may also assign a consistent form of meta-data to the received data streams. That is, one limitation of prior art data analysis techniques is that data sources 101 are available in a variety of forms. Sometimes the "meaning", context, or semantic content of the data is clear (e.g., data table fields with descriptive labels), but in other cases the data may not include a data description and/or might include non-intuitive terms of art. Accordingly, one advantage of the present invention is that it provides a consistent metadata structure and syntax used to characterize the data and facilitate future analysis (e.g., using the hypothesis generating and testing program, described below). In one embodiment, this metadata structure is a fundamental and critical enabler of assisted learning and/or unsupervised learning techniques. The metadata may take a variety of forms (e.g., XML, RDF, or the like), and may include any number of descriptive fields (e.g., time, date range, geographical location, number of shipping containers observed, nationality of vessel, sensing system make and model information as well as sensitivity or resolution, analytic methods or model revision information used to perform any cleansing, analysis, etc.).

Comparison module 170 is generally configured to compare the predictions made via the leading indicator output 180 to the actual, ground-truth values that occur over time. In this way, comparison module 170 assists in validating models as well as signaling to data source analytics modules 160 and 150 that a particular model may need to be further tuned or replaced altogether with a different or more refined version of the model.

In some embodiments, comparison module 170 monitors the predictive power of output 180 and takes an action when a performance metric meets some specified and/or predetermined performance criterion. For example, the performance criterion might correspond to when the correlation coefficient or other performance metric of the model falls below some minimum correlation, accuracy, or precision level. The performance metric might be selected from a variety of criteria depending upon the nature of the model and application, including without limitation classification accuracy, logarithmic loss, confusion matrices, area-under-the-curve, F1 score, mean absolute error, mean squared error, gain and lift charts, and Kolmogorov Smirnov charts.

The action taken based on the result might include, for example, re-running the model on new data, using a different predictive model, and/or temporarily stopping production of a given output 180. In some embodiments, the hypothesis generating and testing system 800 (described below) may be used to train, validate, and test a new model based on its hypothesis testing results.

Data source analytics modules 150 and 160 include suitable hardware, software, and firmware configured to produce and refine predictive analytic models to be used to produce the leading indicator output 180. That is, modules 150 and 160 take the predictor variables derived from the various data sources (i.e., past data) and build a model for predicting the value of a target value (also based on past, historical data) associated with an economic activity metric. The trained model is then later used to predict, using current or contemporaneous information from the data sources, the future value of that agricultural, mining, fishing, harvesting, water production or any other economic activity metric.

As a preliminary matter, the phrase "predictive analytics" is used in the sense of analytic models that are "forward-facing" and are evaluated based on how well they predict future behavior, rather than "descriptive analytics," which are primarily "backward-facing" techniques meant to characterize the nature of the data in the simplest way possible. Thus, for example, Occam's razor and descriptive analytics might suggest that a dataset can be fitted in a manner that produces reasonable $R^2$ and correlation values using a simple linear regression model, while that model may not be as proficient at actually predicting future values when compared to a heterogeneous ensemble model that combines decision trees, neural networks, and other models into a single predictor or series of predictors.

In accordance with the present invention, data source analytic modules 150 and 160 are implemented as one or more machine learning and deep learning models that undergo supervised, unsupervised, semi-supervised, reinforcement, or assisted learning and perform classification (e.g., binary or multiclass classification), regression, clustering, dimensionality reduction, and/or such tasks.

Examples of the models that may be implemented by modules 150 and 160 include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest neighbor, K-means, expectation maximization, hierarchical clustering, etc.), and linear discriminant analysis models. In addition, data sets may be derived using natural language processing (NLP) or large language model (LLM) techniques, such as GPT3 (including, for example, ChatGPT-type interpretation engines), time-series analysis, or the like.

In accordance with various embodiments, CNN techniques are applied to those data sources 101 that include imaging, video and/or audio data. In this way, object detection and classification can be performed. For example, publicly available imaging data may be analyzed to determine the number, class, and origin of farm, fishing, mining, lumber harvesting or transport trucks/machines/vessels traveling on a plot or region of land, waterway, roadway, storage or processing facility at a particular time (e.g., Chinese, Japanese, or Chilean origin fishing vessels operating in the South Pacific Ocean and the like). A trained CNN may also be used to observe marine vessels in the vicinity of a port (as described in further detail below) and determine the number and type of offloaded shipping containers. In yet other embodiments, aerial image data of cattle in an open range, lumber harvesting in a national forest, water levels in a water body, pedestrians or customers in a retail or services environment, passenger or commercial vehicles in a parking lot or roadway, or earth-moving vehicles in an open pit mine may be analyzed to perform object detection and classification of pedestrians, animals, trees, materials, land, vehicles or machinery over time.

Data warehouse 140 is configured to store the various structured and unstructured data generated or otherwise processed by data preparation module 130, comparison module 170, and data source analytics modules 150 and 160.

In that regard, data warehouse 140 may be implemented using a variety of known data storage paradigms, including, for example, a relational database management system (RDBMS) such as Oracle, MySQL, Microsoft SQL Server, PostgreSQL, or the like. Data warehouse 140 may also be implemented using NoSQL databases, distributed databases, schema-free systems (e.g., MongoDB), Hadoop, and/or any other data storage paradigm now known or later developed.

Output 180 of system 100 may be any indicator or set of indicators that are capable of predicting, alone or in combination with other indicators, the state of a natural or human-influences ecological system, agricultural system, watershed or irrigation system, microeconomic and/or macroeconomic system—for example, a metric that characterizes that space. This system may be global, national, regional, online, or any other subset of environmental, ecological, agricultural, mining, fishing or other economic activity, may take a variety of forms, and may correspond to a wide range of attributes.

As with the data sources described above, output 180 will often take the form of discrete or continuous numerical data (e.g., integers, floating point numbers, etc.) or categorical data (e.g., unordered or ordered categories). Output 180 may include a series of time-varying scalar values, one or more matrices or tables, or higher order tensors of numeric values. Output 180 may also be Boolean (e.g., True/False) or may contain the output of deep learning applied image, video or audio inference.

In general, indicators of ecological, environmental, agricultural, fishing, harvesting or other economic events can be categorized as either leading indicators (which precede future events), lagging indicators (which occur after events), or coincident indicators (which occur at substantially the same time as events). In accordance with the present invention, output 180 is preferably either a leading indicator or, when output 180 can be provided to a subscriber very quickly, a coincident indicator.

The semantic meaning of output 180 may vary depending upon context. In the shipping scenario, for example, output 180 might include the estimated weight of some agricultural or fishing product, such as corn, wheat, tuna, salmon, or the like, harvested from, exported or imported into the country during a certain timeframe. In a lumber harvesting scenario, output 180 might be the number and/types of vehicles Utilized in a region of forest at a set of observed locations. In the context of agricultural products, output 180 might include, for example, the percentage of hemp crops that appear to be unusually dark in aerial view images.

The output 180 might also include information that indicates levels of construction or earth moving activity derived by monitoring construction vehicles, movements of heavy equipment, physical changes to construction sites that is then correlated to government published housing starts information and the published reports from corporations involved in construction to create predictive metrics of building or mining activity. The same techniques could be used to track the rate of lumber harvesting, lumber mill activities, livestock farming, road/bridge/building construction, surface mining or mineral collection, chemical refining processes, loading/shipping/unloading of goods at ports of entry, vehicles being sold from a retail car lot, vehicles in inventory after manufacturing, cargo or passenger trains on an entire railway network, to only name a few. These all can be correlated to historical published or private reports of economic activity to model and ultimately predict economic market trends.

Figure 2:
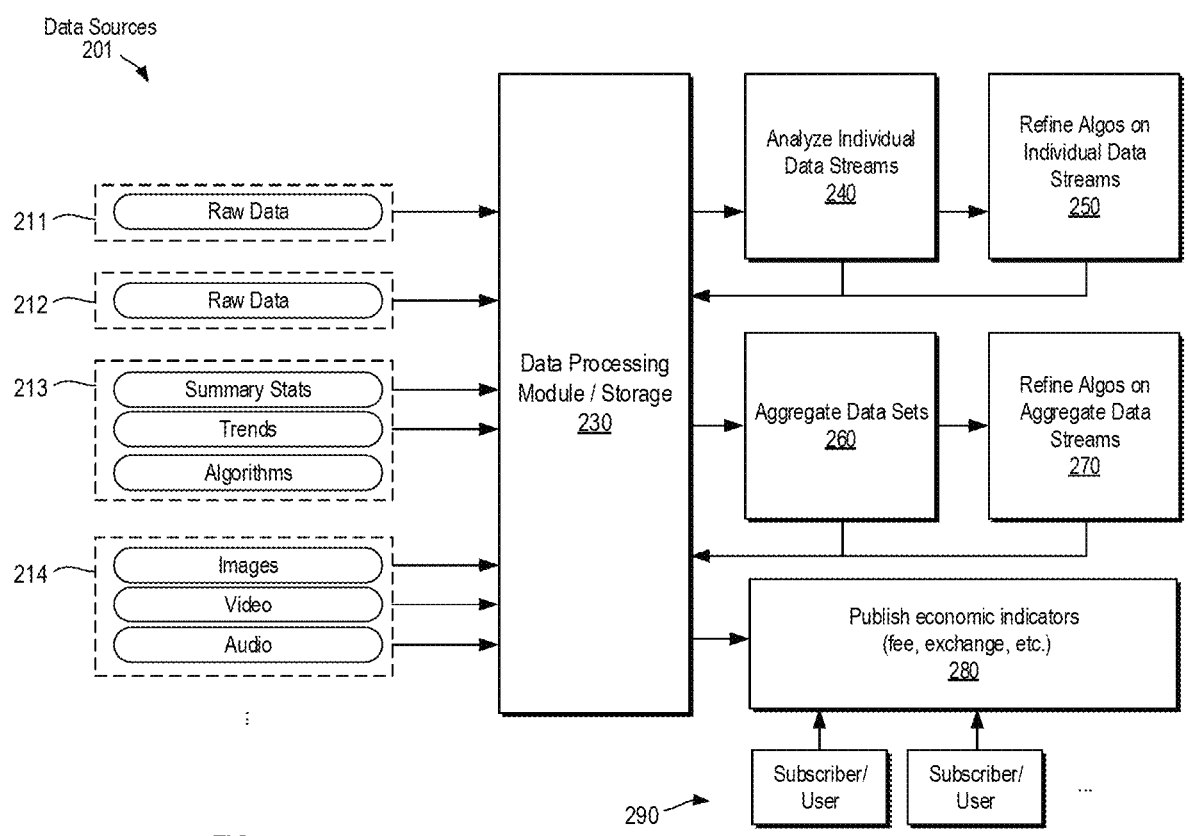
FIG. 2 is a conceptual block diagram and process flow for a predictive analytics system in accordance with various embodiments.

FIG. 2 presents a combination block diagram & flow chart that illustrates, generally, the way information and data may flow through PAS 100 as illustrated in FIG. 1. More particularly, referring now to FIG. 2 in combination with FIG. 1, data sources 201 may include various raw data streams (211, 212) as well as composite data types such as, for example, summary statistics, trends, and algorithms (213), or images, video, and audio streams (214). Data sources 201 in FIG. 2 thus generally correspond to data sources 101 in FIG. 1.

Similarly, data processing and storage module 230 in FIG. 2 generally corresponds to data preparation module 130 and data warehouse 140, and is configured to clean, sort, filter, concatenate, process, and otherwise format the data from data sources 201. Subsequently, individual data streams are analyzed (module 240) and then the various predictive analytics models for those data sources are refined and fed back to module 230 (via module 250). In general, the phrase "dataset" as used herein refers to a portion or subset of data received from a data stream. In parallel, aggregate datasets are analyzed (module 260), refined (module 270) and provided back to module 230 for storage. Thus, modules 240 and 250 together correspond to module 150 in FIG. 1, and modules 260 and 270 generally correspond to module 160 of FIG. 1.

Finally, via a publishing module 280, the various leading indicators (generally corresponding to output 180 in FIG. 1) are provided to a set of subscribers/users 290. The published indicators, data models, predictions, may be provided in exchange for a fee (e.g., a one-time fee or subscription fee), or may be provided in exchange for access to privately owned data sources or other information of value to the process as illustrated.

FIG. 7 is a flowchart illustrating a method 700 in accordance with one embodiment of the present invention, and generally corresponds to the major processes illustrated in FIG. 7. More particular, data is first received from a plurality of data sources (step 701), followed by data cleansing and pre-processing (702). Subsequently, predictive analytics are performed on individual data streams (703) and the resulting models and algorithms are refined (704). Metadata may then be assigned to the resulting data (705). The datasets are aggregated (706), and then the predictive analytics models and algorithms for the aggregated data are further refined (707) as previous described. Finally, the leading indicators are published for use (708).

As mentioned in the Background section above, predictive factors are likely to be buried in a vast array of fast-moving data streams that cannot be analyzed in the traditional manner by human beings—i.e., the time consuming process of applying traditional hypothesis testing and the scientific method to such data by humans is impracticable.

To remedy this, FIG. 8 illustrates a hypothesis generating and testing system (HGTS) 800. In general, HGTS 800 can be seen as a further abstraction of the predictive analytics system 100 of FIG. 1, in that it uses machine learning techniques to teach itself how to form the predictive analytics models described above. Thus, HGTS can be seen as a generative AI system or a form of general artificial intelligence operating in the field of ecology, environmental science, agriculture, mining, fishing, forestry, transportation, retail or services business, finance and banking industry, stock or equity trading, consumption of goods or services, pedestrian or customer or patient behavioral modeling, business outcome modeling or other economic activities.

In general, analytics engine 830 is configured to form its own hypothesis (e.g., "is variable 1 correlated to variables 2 and 3?") and subsequently test that hypothesis on cached data 831 and/or data sources 801. More particularly, analytics engine 830 is configured to generate a hypothesis object comprising at least a set of independent variables, a dependent variable (or variables), a machine learning model (i.e., a type of model), and metadata associated therewith. This hypothesis object and its associated data structure may be stored in any convenient manner known in the art (e.g., as a JSON file, data object, etc.). Thus, engine 830 is capable of performing its own planned experiments. The experimental results and conclusions of its experiments (e.g., correlation coefficients, analysis of variance, etc.) are stored along with the hypothesis object itself in a metadata format so that ongoing trends in model accuracy can be observed and utilized to further improve both model/algorithm accuracy as well as the hypothesis generating and testing system.

In order to facilitate the creation of hypotheses, a consistent metadata format is provided. This allows the system to minimize the effort required for unassisted hypothesis generation and testing by properly presenting data for analysis, thus more-effectively "compare apples to apples." The structure of the metadata may vary, but in one embodiment the metadata includes data format, date range, sensor type, sensor accuracy, sensor precision, data collection methods, location of data collection, data preparation methods performed, image content ranges, NLP methods, data source/publication, and the like.

The metadata associated with the datasets and the models enables the HGTS to do more than simple variable correlation analysis. Hypotheses can be generated and tested by looking for potential variables or correlations that have a relevance to like data via semantic, geographical, time-series based, market segment, customer based, or other correlating factor. For example, if the HGTS is trying to develop an accurate model to predict consumer shopping patterns in a series of retail stores in a particular city, it would typically not prioritize data associated with fishing vessel traffic on the other side of the planet. Instead, it would explore context adjacencies that have some reasonable association with the hypotheses being tested. An example of a context adjacency is a search for pedestrian camera feed data in the greater metropolitan area of that city, credit card transaction patterns from that same region, consumer sentiment data, regional GDP correlations and the like. Thus, the CAAD is the mechanism that supports the generation of scientifically reasonable and relevant hypotheses. Without robust metadata information, data has little meaningful context; without meaningful context, hypothesis are of little scientific value. The CAAD and HGTS working in harmony can mimic the way scientists process immense amounts of raw data and transform that data into manageable and meaningful information that can guide efficient exploration of learning opportunities. Furthermore, because of the HGTS's ability to continuously improve correlations and the ability to continuously add additional relevant data sources over time, the system described herein has the ability to "learn" from it's historical activities and improve over time autonomously or with the aid human reinforcement.

Referring now to FIG. 8, HGTS 800 generally includes an analytics engine 830 that receives data from data sources 801 (e.g., 811-814 and 821-823), including both public data 810 and private data 820. The nature of this data is the same as previously described in connection with FIGS. 1 and 2. Analytics engine 830 also includes a cached data store 831 for storage of data used in prior experiments.

Engine 830 may begin by performing an initial round of experiments with limited datasets to assess whether a particular hypothesis is likely to be successful. After initial correlations are found, the engine 830 prioritizes a list of possible hypotheses and seeks to explore those. This is comparable to the separate training, validation, and testing steps used in connection with training machine learning, deep learning, assisted learning or other models.

As is known in the art, a leading indicator may be characterized by its direction relative to the attribute it is being tested against—i.e., procyclical (same direction), countercyclical (opposite direction), or acyclical (no correlation). As illustrated in FIG. 8, after an experiment has concluded, the results (840) inform how the experiment is treated. Specifically, if there is a statistically significant correlation-either positive or negative (i.e., countercyclical or procyclical)—the metadata, model, and data for that experiment are stored in context-aware artificial intelligence database (CAAD) 850. If there is a non-existent correlation (i.e., acyclical), the entire experiment is discarded. If, however, the determined correlation and/or its statistical significance are borderline or otherwise weak, then that experiment may be stored within probationary database 851 for further correlations refinement with additional hypotheses to be tested when additional computation cycles or when additional data become available. This is of critical importance as economic trends are never due entirely to a single factor but rather are a culmination of an extensive set of dependent and independent variables (as those terms are known in the art). Thus, as societies change with the advent of new technologies, new geo-political issues, new trade deals, new manufacturing methods, new shipping methods, new laws or policies, new weather patterns, etc. new variables will begin to emerge with greater significance where they previously were irrelevant and vice versa. By storing hypotheses in a probationary database it is possible to trend correlations over time and begin to explore new factors that may be been previously unknown or undervalued in performing economic analyses or retest hypotheses as new data sources and new variables are presented to the CAAD or as new information is added to existing data sources and variables. This would provide a major advantage for any system of analytics as the prioritization of variables of emerging relevance could become easily identifiable.

The above systems and methods may be used in scenarios where regional epidemics, global pandemics, environmental or ecological changes, newly permitted lands, military or political conflicts, or socioeconomic unrest arise in order to precisely measure the impact in economic activity trends associated with changes in manufacturing, processing, shipping, storage, distribution, and tourism by region, by economic sector and by company. Such information may be a leading indicator used to make more informed investment decisions.

The successful experiments stored within CAAD 850 can then be re-used or incorporated into subsequent experiments by analytics engine 830. Similarly, analytics engine 830 may choose to recall an experiment from probationary database 851 and refine it for further testing-perhaps using a larger or less noisy data set, or changing dependent/independent variables.

What has been described in this application and the parent applications are systems that can be classified, in modern terms, as a "generative AI" system—that is, a model or models that can generate content. In this case, the content consists of scientific hypotheses regarding the relationships between independent variables and economically-relevant dependent variables, as well as the metadata, procedures, tests, results, and conclusions arising out that testing.

Referring now to FIG. 9, which is an expanded version of the generative AI system (or HGTS) illustrated in FIG. 8, the analytics engine 830 may include an AI Agent (or "AI Trigger") 930, one or more natural language processing (NLP) models 932 (e.g., transformer networks, large language models (LLMs), etc.), a visual analytics module 934, a time series ML module 936, and any other modules 938 useful in the context of ML and predictive analytics. Also shown in FIG. 9 are a number of external sources 960 (e.g., 961, 962, etc.) communicatively coupled to engine 830 via a network 910 (e.g., the Internet).

AI Agent 930 includes any combination of hardware and software configured to perform a series of actions autonomously based on an intended result (which may be derived from any other module within engine 830), and to perform dynamic learning by understanding the relevant context and adapting to new data and experiments. Examples of such agents include, without limitation, AutoGPT and Microsoft's Jarvis model, which are known in the art. Unique to this invention, however, is that AI Agent 930 can autonomously check for updated models, published studies, and results, and at the same time may "trigger" an action based on the observed data and the most relevant sources. AI Agent 930 may also generate its own prompts—i.e., perform its own prompt engineering to pass to NLP models 932.

As informational asymmetry and speed of execution together give one party an advantage over another party in the context of the trading of securities or other investor activities, the triggers allow a party (i.e., the subscriber) to benefit from new information faster than others.

For example, since the triggers implemented by AI Agent 930 can be highly correlated to very short duration events, text analysis of an earnings announcement could occur in less than one microsecond of publication of the announcement and immediately trigger a buy, sell, or short action. This action could then be processed within that same microsecond once a correlation threshold is "triggered," resulting in profit as additional investors take time in the minutes and hours that follow to capture the same information and arrive (slowly) at the same conclusion.

As a further example, AI Agent 930 may capture sentiment within a community and then compare that sentiment instantaneously to the sentiment of a published written report to thereby track a difference between predicted and actual performance. The model may only be highly accurate for a few milliseconds, seconds, minutes, or hours after the triggering event, but is exceptionally accurate within that brief window.

As yet another example, consider a retail store environment in which customers proceed through checkout and leave the store with shopping bags within 120 seconds+/−60 seconds >99.9% of the final checkout transaction time. In the event that a camera feed within the store detects someone departing the check-out area with no bags, there can only be a handful of reasonable explanations. Thus, in that instance the trigger will result in examining the individual shopper to determine whether: (1) they entered the store with a bag already and thereby can be assumed to have entered the premises for a merchandise return; (2) their customer credit or payment method was declined and they had to leave the store; or (3) the customer had a poor checkout experience and chose to leave the store without completing the transaction. This information can be valuable to the retail store manager, owner or corporation to identify possible employee training gaps, equipment malfunctions, shopper demographic changes, and the like.

Performing such data-intensive analysis may not be economically viable on normal shopping transactions due to computation resource, network traffic, cloud storage costs, and the like, and thus use of "trigger" or "activation" models could yield a major economic and/or business benefit if the location of the computational and storage resources that manage and execute the "trigger" or "activation" models is optimized for most efficient utilization of resources across the sensors, edge, network or cloud. The output of the "trigger" or "activation" models could be implemented on a subscription notification basis to improve customer shopping experiences, business outcomes, machine uptime, patient outcomes, financial transaction quality, identify possible security breaches, and the like. Such "trigger" or "activation" models, which are implemented by AI Agent 930, can be stored within primary CAAD 850 or probationary CAAD 851 for additional hypothesis testing as described above.

The various modules within engine 830 are able to interact with external databases and systems 960, which may include data, published studies, and other resources. AI Agent 930 provides a mechanism by which engine 830 can interrogate those resources 960 to perform its own analysis (and/or meta-analysis) of that data, refining its hypothesis adaptively over time. That is, based on a generated hypothesis, AI Agent 930 can engage in the scientific process and test that hypothesis autonomously. The results can then be processed by CAAD 850 and probationary database 851 as described above.

It will be apparent, then, that AI Agent 930, working within the context of engine 830, approaches what has been termed artificial general intelligence (AGI)—a system that can effectively learn how to learn and make its own contribution to the scientific (or economic theory) literature. This ability to make advances on its own will greatly improve economic, financial, health, environmental, ecological, agricultural, fishing, harvesting, mining, construction, business, scientific, academic, physical/information security, and pharmacological outcomes.

Time Series ML Models 936 are configured to perform any number of traditional time-series learning known in the art, such as random walk models, auto-regressive models (AR), moving average models (MA), auto-regressive moving average models (ARMA), auto-regressive integrated moving average models (ARIMA), and generalized autoregressive conditional heteroskedasticity models (GARCH). In general, models 936 are adapted to partition data sets to find optimal correlations by breaking down a model into different buckets, groupings, time durations, population statistics, and the like. For example: performing the same time-based correlation analysis vs an array of target variables, but determining which variables better correlate to <1 second, <1 minute, <1 hour, <1 week, <1 month, <1 a quarter, and the like. The system can then determine which data set statistical unit (e.g., descriptive statistic) provides the best correlation. Specifically, there may be particular time ranges in which one-time duration is better correlated than other time ranges.

Visual Analytics module 934 is configured to examine graphical data (in printed or electronic form) and derive information therefrom. That is, module 934 may segment vector analytic, image, or video encoding, decoding, filtering, analyzing methods. Furthermore, columns, channels, rows, cells, or pixels can be examined over an infinite combination of both quantization minima, clustering, and other spatial dimension quantization methods. There may be scenarios in which both uniform and non-uniform spatial quantization of images, videos, or other spatial analytic output can be combined for better correlative outcomes. This information may then be combined with other analytic methods to create a more comprehensive and complete picture of the context and value of an image.

NLP Models 932 include one or more natural language processing models now known or later developed. Such models include, for example, transformer-based LLMs (Open AI's GPT-x, ChatGPT-x, Google's BERT, Google's LaMDA or PaLM, Meta's LLaMA, and a host of available open-source LLMs). Such natural language programming might also perform one or more of: sentiment analysis, named entity recognition, summarization (of data and/or scientific studies), topic modeling, text classification, keyword extraction, lemmatization, and stemming.

For example, uniform spatial quantization of the same satellite image may yield deterministic and quantifiable information about one subject within the image such as number of pedestrians entering or leaving a retail store, but a non-uniform spatial analysis of the same image may yield deterministic and quantifiable information about a different subject in the same image-such as the demographics of individuals entering and leaving the retail store, the mood or sentiment or emotions of an each individual entering or leaving a store correlated to the duration the individual was in that store and the context of their activity while in the store.

When combined with the output of NLP Models 932, Time Series ML Models 936, and other data sources with a clear time correlation, one can determine that a third, fourth, fifth, et al machine learning method can extract additional value. The combination of such methodologies can trigger access to additional context, personal or business value in identifying causality and context in otherwise uncorrelated analytic methods and disparate data sources.

RLHF 902 is a mechanism by which reinforcement learning can be provided to one or more modules of engine 830. That is, as is known in the art, human feedback may be provided to "align" the output of a LLM (e.g., ChatGPT) to human preferences. Such RLHF 902 procedures may be used to improve performance, optimization of prompts, and overall training accuracy. That is, it is typical for LLMs to be trained using a loss function based on next-token prediction, which does not always conform to human expectations. This training may take place via actual physical humans interacting with engine 830 (and judging results in real-time), RLHF 902 might also use known question/answer forums (such as Reddit channels (subreddits), Quora, Stack Overflow, and the like), in which users have already ranked the value of answers in various ways. In this way, a reward model (RM) can be incorporated into engine 830 to better represent the ways that humans have traditionally engaged with the scientific method.

Example Embodiment: Securities Trading

In accordance with one embodiment, the ML and AI techniques described above are used in the context of economic analytics, forecasting, and autonomous decision making as applied to securities trading. As a threshold matter, the term "securities" is used consistent with the way that term is used by a person of ordinary skill in the art, and encompasses any type of negotiable financial instrument (either fungible or non-fungible) that holds some type of monetary value. In general, such tradable securities generally include equity, debt, and hybrid securities that combine aspects of both categories. Non limiting examples of typical securities include: stocks (common or preferred), equity transactions, investment contracts, crypto-assets (stored value, NFTs, etc.), certificates of deposit, corporate bonds, equity warrants, convertible bonds, commodities, derivatives (options and futures), index funds, water rights, land rights, licenses, and the like. It will be appreciated that the foregoing list is not intended to be exhaustive, and the present subject matter may be applied to any security now known or later developed.

In accordance with the security-trading embodiment, the CAAD 850 and probationary database 851 are used to store relevant data associated with a range of companies and their market competitors, including earnings announcement, sentiment analysis, market expectations, stock data, press releases, and any other current and historical public/private information pertinent to the valuation of a company or companies.

More particularly, CAAD 850 (or a distributed set of CAADs) are used to store historical stock activity, earnings reports data, press releases for individual stocks, association information between different companies to identify competitors, partners, and value chain associations. Such databases, along with any publicly available data, can assist with identifying the value of leading indicators as predictors of future performance, future earnings reports, and the like.

CAAD 850 is also used to store models, algorithms, and correlations of historical activities to provide a prediction of potential future outcomes. Models may include a variety of types, including, for example, LLMs for sentiment analysis of earnings reports, quantitative analysis of individual stock performance vs. benchmarks, interest rates, micro/macro economic variables, competitors, and any of the other models and information described above.

Once CAAD 850 and probationary database 851 have been populated with such data, analytics engine 830 is employed to perform quantitative and qualitative analysis of the data and create a predictive model that can be applied to upcoming earnings calls for a given company and run that model in real-time during earnings. This allows the execution engine to trigger instantaneous stock trading based on what the expected outcome from the market should be, within a set of user-defined criteria. Analytics engine 830 can compare the predicted outcomes to actual outcomes, and thereby further refine the models and identify new or emerging correlations. This might also include providing an HITM-confirmed or AI-confirmed database and a probationary-database, or configuring metadata that identifies models or data as having been optionally HITM-confirmed or AI-confirmed.

For example, an earnings report may be released by a company that shows better—than-expected performance in the current quarter, and a healthy outlook for future quarters. Analytics engine 830 can then near-instantaneously analyze the earnings report (e.g., in a fraction of a second) the precise moment of the earnings release and immediately purchase the stock in an amount commensurate with the predicted return before a human analyst can even begin to read the first paragraph of the report. Furthermore, the system may trade other stocks of partners or competitors based on the results of the reports. For example, if a company reports a gain in market share of 3.0% in a mature market, it can be expected that the companies competitors will be negatively impacted by the news. Comparing the data, the sentiment, the forecast of the report could provide a major trading advantage. More generally, analytics engine can perform a game-theoretical analysis of the market (e.g., analyzing competitive, noncooperative market forces) in near-real-time and determine the likely reaction of the company and its competitors.

In accordance with one embodiment, system 800 has the capability to: create a range of scenarios for purchasing or selling equities or options based on probability distributions derived from the models described above. Transactions can be performed based on higher or lower-than-expected earnings vs. expectations, sentiment analysis of descriptions in a report, correlation to other competitors in the market, all weighted by other economic factors (index performance, interest rates, and the like). An optional HITM scenario could be deployed to decide whether the hypotheses created are permitted to be executed with live trades or the hypotheses created must be kept in observation-mode until further refinement or confidence in algorithmic weights and biases can be sufficiently validated. This may be configured as an HITM-driven step or AI-driven step.

The system 800 may further provide a graphical user interface or "dashboard" where reports can be easily generated and filtered to enable an investment banking institution or individual investor to decide which of the models or hypotheses should be "activated," subscribed to, tracked, monitored, or purchased. This interface is preferably linked to publicly available or private trading networks (such as E-Trade, Chase, Fidelity, and the like) so that when the approved event conditions are met, the transactions can occur within microseconds.

In the security trading context, the "leading indicator" as described previously may include a recommendation regarding whether a particular security (or set of securities) should be bought, sold, or held. The leading indicator might also include any indicia bearing upon the future performance of a target company and/or its competitors.

The subscription engine is configurable to either provide alerts to a human or distribution list (HITM), or may be configurable to provide autonomous execution capabilities within controlled and selectable parameters. For example, combinations of metrics from otherwise disparate sources could be used independently or in combination to provide an indication of where a security might be heading relative to peer groups of similar companies, relative to broad market indicators, relative to global economic factors. For example, a commodity such as wheat or soybeans might be showing signs of stability; however, recent geo-political disruptions, supply-chain bottlenecks that could be observed at ports of entry or shipping routes, crop impacting weather patterns that can positively or negatively impact crop yields, and the like could all become variables in how a particular commodity will be trading in the future. Thus, trades may be executed in advance of a market valuation change because of analytic predictions from aggregation of these data sources to provide a more comprehensive, real-time, regional or global view.

Similarly, information gathered from traffic cameras, satellite or aerial images and the like could indicate a decrease in activity for one competitor vs another in like markets. For example, aggregation of traffic images might indicate that FedEx freight shipping vehicle activity is down by a statistically significant value while at the same time UPS freight shipping vehicle activity is up by a statistically significant value. This could be used as a direct measure of increase in market share for one competing entity relative to another. In the scenarios described above, the system may be configured to provide alerts or to autonomously perform actions within a predetermined framework of allowed activity.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field programmable gate-arrays (FPGAs), dedicated neural network devices (e.g., Google Tensor Processing Units), quantum computing, visual or image processing units, graphic processing units (GPUs), system on chips (SOCs), central processing units (CPUs), microcontroller units (MCUs), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A generative artificial intelligence (AI) system for securities trading, comprising:
   a plurality of data sources, wherein at least one of the data sources is sensor data derived from direct observation of activity within an environment;
   a context-aware AI database;
   a probationary database;
   an analytics engine communicatively coupled to the plurality of data sources, the context-aware AI database, and the probationary database;
   wherein the analytics engine is configured to:
   (a) generate a hypothesis object comprising independent variables, a dependent variable including a leading indicator of economic activity associated with at least one of a corporate entity and a security associated with the corporate entity, a machine learning model trained from available data, and metadata associated therewith based on the data sources, wherein the leading indicator includes at least a recommendation to buy, sell, or hold a security associated with the corporate entity;

(b) train the machine learning model associated with the hypothesis object to produce experimental results;

(c) store the hypothesis object and the experimental results in the context-aware AI database in response to determining that the performance metric of the machine learning model meets a predetermined performance criterion;

(d) store the hypothesis object and the experimental results in the probationary database in response to determining that the performance metric of the machine learning model does not meet a predetermined performance criterion; and a publishing module configured to provide, to one or more subscribers, the leading indicator associated with at least one of the corporate entity and a security associated with the corporate entity, as computed by the trained machine learning model stored within the context-aware AI database while processing contemporaneous information received from the data sources wherein: the analytics engine and context aware database interact to perform dynamic learning based on at least one of a determined context, a new set of data, and new set of experiments; the hypothesis object achieves a performance metric greater than or equal to the predetermined level; and the hypothesis object and new experimental results are thereafter transferred from the probationary database to the context-aware AI database.

2. The generative AI system of claim 1, wherein the analytics engine is communicatively coupled via a network to a plurality of external sources, the external sources configured to store information regarding third-party hypotheses and associated experimental results for use by the analytics engine in generating the hypothesis object.

3. The generative AI system of claim 2, wherein the analytics engine includes an AI agent configured to perform a series of actions autonomously, the actions including at least generating the hypothesis object, training the machine learning model, interrogating the context-aware AI database, interrogating the probationary database, and interrogating the plurality of external sources, executing on either alerts (HITM) or actions that are carried out autonomously within defined parameter windows.

4. The generative AI system of claim 1, wherein the analytics engine includes a natural language processing (NLP) module.

5. The generative AI system of claim 4, wherein the NLP module includes at least one transformer-based large language model (LLM).

6. The generative AI system of claim 1, wherein the analytics engine includes a large language model (LLM).

7. The generative AI system of claim 6, wherein the LLM performs instantaneous analysis of publicly available information, including at least one of: Federal Chairman meeting notes, earnings reports, labor reports, and housing reports.

8. The generative AI system of claim 7, wherein the LLM output is compared against historical analysis of reports, databases, earnings calls, earnings publications, Federal Chairman meetings, and thereby creates a body of data that can be used to train and retrain against predetermined criteria, including at least one of sentiment analysis, qualitative analysis, quantitative analysis, indicator analysis, and metric analysis.

9. The generative AI system of claim 8, wherein the LLM output is compared against predetermined criteria such as sentiment analysis, qualitative or quantitative analysis, indicator or metric analysis, and the like and this information is used to either buy, sell, short, or otherwise instantaneously execute trades based on predicted market moves expected from those reports.

10. The generative AI system of claim 1, wherein the analytics engine includes a visual analytics module.

11. The generative AI system of claim 1, wherein the analytics engine includes a time series module.

12. The generative AI system of claim 1, wherein the plurality of data sources include video and/or time-lapse images characterizing the environment from at least one of an aerial and ground-level view.

13. The generative AI system of claim 1, further including a reinforcement learning from human feedback (RLHF) component to further refine at least one of: selection of the hypothesis object, training the machine learning model, interrogating the context-aware AI database, interrogating the probationary database, and interrogating the plurality of external sources.

14. An analytics engine for use with a generative artificial intelligence (AI) system configured for securities trading, wherein the AI system receives a plurality of data sources, and is communicatively coupled to a context-aware AI database and a probationary database, wherein the analytics engine is configured to:

(a) generate a hypothesis object comprising independent variables, a dependent variable including a leading indicator of economic activity associated with at least one of a corporate entity and a security associated with the corporate entity, a machine learning model trained from available data, and metadata associated therewith based on the data sources, wherein the leading indicator includes at least a recommendation to buy, sell, or hold a security associated with the corporate entity;

(b) train the machine learning model associated with the hypothesis object to produce experimental results;

(c) store the hypothesis object and the experimental results in the context-aware AI database in response to determining that the performance metric of the machine learning model meets a predetermined performance criterion;

(d) store the hypothesis object and the experimental results in the probationary database in response to determining that the performance metric of the machine learning model does not meet a predetermined performance criterion; and a publishing module configured to provide, to one or more subscribers, the leading indicator associated with at least one of the corporate entity and a security associated with the corporate entity, as computed by the trained machine learning model stored within the context-aware AI database while processing contemporaneous information received from the data sources;

wherein: the analytics engine and context aware database interact to perform dynamic learning based on at least one of a determined context, a new set of data, and new set of experiments; the hypothesis object achieves a performance metric greater than or equal to the predetermined level; and the hypothesis object and new experimental results are thereafter transferred from the probationary database to the context-aware AI database.

15. A generative artificial intelligence (AI) method for securities trading, comprising:
providing a plurality of data sources, wherein at least one of the data sources is sensor data derived from direct observation of activity within an environment;
providing a context-aware AI database;
providing a probationary database;
providing an analytics engine communicatively coupled to the plurality of data sources, the context-aware AI database, and the probationary database;
generating, with the analytics engine, a hypothesis object comprising independent variables, a dependent variable including a leading indicator of economic activity associated with at least one of a corporate entity and a security associated with the corporate entity, a machine learning model trained from available data, and metadata associated therewith based on the data sources, wherein the leading indicator includes at least a recommendation to buy, sell, or hold a security associated with the corporate entity;
training the machine learning model associated with the hypothesis object to produce experimental results;
storing the hypothesis object and the experimental results in the context-aware AI database in response to determining that the performance metric of the machine learning model meets a predetermined performance criterion;
storing the hypothesis object and the experimental results in the probationary database in response to determining that the performance metric of the machine learning model does not meet a predetermined performance criterion; and
providing, to one or more subscribers, the leading indicator associated with at least one of the corporate entity and a security associated with the corporate entity, as computed by the trained machine learning model stored within the context-aware AI database while processing contemporaneous information received from the data sources;
wherein: the analytics engine and context aware database interact to perform dynamic learning based on at least one of a determined context, a new set of data, and new set of experiments; the hypothesis object achieves a performance metric greater than or equal to the predetermined level; and the hypothesis object and new experimental results are thereafter transferred from the probationary database to the context-aware AI database.

16. The method of claim 15, wherein the analytics engine includes a plurality of data sources combined to create a comprehensive historical view of dependent variables selected from the group consisting of time-series, ground level images or video, aerial images or video, public microeconomic or microeconomic indicators, private microeconomic or macroeconomic indicators, LLM analytic information from historical earning reports, earnings calls, earnings publications, and competitive information, to create a historical model of dependent variables that influence valuation of the security.

17. The method of claim 15, wherein the trained models can be used to predict future trends and outcomes in securityvaluations and those predications can be configured to perform at least one of: a) trigger an alert for HITM execution of transactions once the performance criterion is met; b) trigger an autonomous execution of transactions once the performance criterion is met; c) document a hypothesis in the form of a predicted future outcome for the security based on the trained model or models and then output a report of predicted vs actuals over time for the purposes of improving the trained models or demonstrating confidence in the trained model over time.

* * * * *

UNITED STATES PATENT AND TRADEMARK OFFICE
CERTIFICATE OF CORRECTION

PATENT NO. : 12,086,178 B2
APPLICATION NO. : 18/625612
DATED : September 10, 2024
INVENTOR(S) : Brian McCarson It is certified that error appears in the above-identified patent and that said Letters Patent is hereby corrected as shown below:

In the Claims

Column 21, Line 11 (Claim 1), "the performance metric" should read --a performance metric--.

Column 21, Lines 17-18 (Claim 1), "a predetermined" should read --the predetermined--.

Column 22, Line 47 (Claim 14), "the performance metric" should read --a performance metric--.

Column 22, Line 53 (Claim 14), "a predetermined" should read --the predetermined--.

Column 23, Line 23 (Claim 15), "the performance metric" should read --a performance metric--.

Column 23, Line 34 (Claim 15), "a predetermined" should read --the predetermined--.

Signed and Sealed this
Twenty-fifth Day of November, 2025

John A. Squires
*Director of the United States Patent and Trademark Office*